Oct. 25, 1938.  J. GODENNE  2,134,248
FURNACE LINING, ESPECIALLY OF HIGHLY HEATED METALLURGICAL FURNACES
AND PARTICULARLY TO LININGS OF FURNACE GAS PORTS
Filed Dec. 11, 1935

Inventor:
Jean Godenne
Attorneys:

Patented Oct. 25, 1938

2,134,248

UNITED STATES PATENT OFFICE 2,134,248

FURNACE LINING, ESPECIALLY OF HIGHLY HEATED METALLURGICAL FURNACES AND PARTICULARLY TO LININGS OF FURNACE GAS PORTS

Jean Godenne, Anzin, France

Application December 11, 1935, Serial No. 53,967
In France February 14, 1935

4 Claims. (Cl. 263—15)

The present invention relates to gas ports of highly heated metallurgical furnaces, such as basic Siemens-Martin furnaces.

The gas ports of highly heated furnaces, in which the slag question plays a considerable part, are gradually destroyed during the operation of the furnaces. Since the furnace linings also have in part to withstand considerable wear they must constantly be entirely renewed after a certain amount of destruction has taken place, in order to enable further operations to be carried out.

It has not hitherto been possible to produce a furnace construction material, which will stand to all the stresses and strains resulting from the high temperatures employed, the attacks by scorifying substances and mechanical strains. Consequently the best way out of the difficulty hitherto has always been to employ a furnace material, which ensured the furnace functioning for a certain time. In the case of highly heated metallurgical furnaces, for example basic Siemens-Martin furnaces, silica bricks have been used for the construction of the gas-ports. These silica bricks however fuse comparatively rapidly under the influence of the high temperatures and of the particles of ferric oxide and lime carried along with the flame.

Attempts have also already been made to replace the silica bricks by bricks of other, very highly refractory materials, particularly highly refractory oxides or oxide mixtures, which in turn, owing to their chemical nature—in contradistinction to the silica masonry—do not form any easily melting compounds with the attacking substances and which on the other hand also have so high a melting point, that the lining does not reach the point of fusion at the temperatures prevailing in the furnace. A satisfactory result could however not be obtained by the use of these highly refractory building materials. In this case also destruction of the masonry took place after a more or less long time. This destruction is effected by the migration of the slag particles into the bricks. Consolidation of the masonry takes place, whereby the lining breaks off in scales to a more or less considerable thickness when changes in temperature take place. The destruction is further promoted owing to the fact that the bricks made of the aforesaid highly refractory materials cannot be satisfactorily welded. Finally gasports, particularly those made of magnesite bricks, show a strong tendency to form slag deposits, whereby the free passage of the gases is hindered, which in turn gives rise to disturbances in operation.

The object of this invention is to provide gas ports, the construction of which constitutes an essential improvement of the methods of construction hitherto used and which has a long life.

According to the invention the core or the main mass of the gas ports is made of a refractory material of high thermal resistance, for example highly refractory oxides and oxide mixtures. In these parts, which, as well as being subjected to high temperatures, are also subjected to the above described detrimental scorifying action, the main mass is supported by a layer of refractory material of lower melting point, but of higher physical resistance or tenacity at high temperatures and which has not tendency to form slag deposits.

Owing to the fact that the gas ports are thus made of a plurality of materials, each of which has definite functions assigned thereto, i. e. the fulfilment of all functions is distributed over a plurality of materials, it is possible so to construct each individual part of the gas ports for the function thereof, that it is particularly capable of standing up to the requirements in question. Thus, for example, the highly refractory main mass may be made compact and mechanically strong at high temperatures without regard to the capability of resisting abrupt changes in temperature and conversely the inner surface of the arch may be made to fulfil its particular function of a construction adapted for supporting the main mass.

The invention will now be described by way of example in relation to a gas port for a basic Siemens-Martin furnace with reference to the accompanying drawing, wherein—

Figure 1:
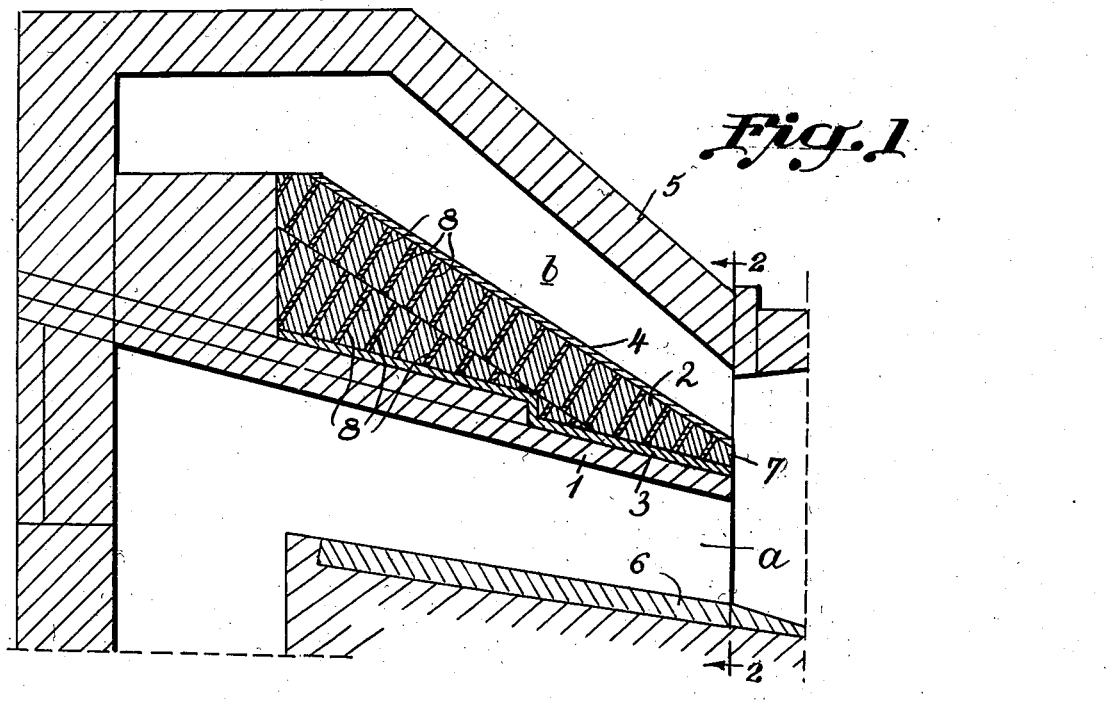
Fig. 1 is a longitudinal section through the gas port.
Figure 2:
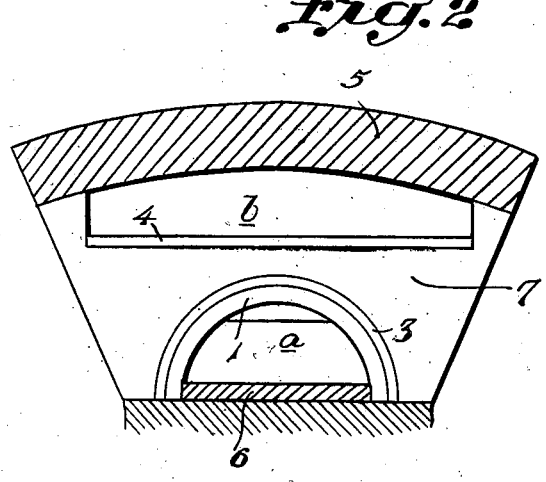
Fig. 2 is a cross section along the line 2—2 of Fig. 1 as viewed from the front of the gas port.

According to this embodiment the arch 1 of the gas port $a$ is made of silica bricks, which may be made in varying size depending upon the dimensions of the furnace. The layer of silica bricks is, however, maintained fairly thin in relation to the entire mass of masonry between the gas port $a$ and the air port $b$. Above this arch 1 of silica bricks a thinner layer (about 1 cm.) of a fine mortar 3 of neutral material, for example chromite, is disposed and the mass 2 defined above as main mass, which consists of highly refractory materials, for example bricks or tamping masses of magnesite or other highly refractory oxides, is applied thereto. The bricks of the mass 2 are joined together by a layer, which effects an intimate bond on fusion, for example thin steel strips 8. When using tamping masses it is advisable to add suitable quantities of a flux, which under the action of the furnace temperature forms a compact and mechanically resistant mass from the highly refractory main material. The upper surface of the mass 2 facing the air port is covered with a chromite layer 4. The air port b is in turn provided with an arch of silica bricks 5. The bottom of the gas port a is indicated as 6.

The thickness of the arch 1 of silica bricks may diminish towards the tongue 7 and conversely may increase in the reverse direction.

Even when the thickness of the supporting arch is relatively small it is protected from the influence of the flames and slags by the main mass of the burner. This mass may be made of refractory materials which are more difficultly fusible and more difficultly soluble in slag than silica bricks.

The arrangement illustrated practically avoids reactions which might take place at elevated temperature between magnesite masses or neutral masses and the acid substances, insofar as acid substances are used for the construction of the inner arch. Owing to the high melting point of the basic masses disposed above the arch, fusion can scarcely be observed and reactions of these highly refractory products with those disposed beneath are reduced to a minimum. In operation the supporting arch fuses back more rapidly than the main mass, its products of fusion can fall down side by side and accordingly do not interact with one another. Since the arches, as hereinbefore stated, are only of slight thickness, the proportion of fused products also is smaller and accordingly their action on the bottom of the ports is also slight, in any cases much slighter than if the entire mass of the gas ports were to consist of silica masonry.

The employment of the described silica arch furthermore enables the inner cross section of the gas port a to be maintained. In the course of the furnace operation only slow widening takes place.

In the embodiment illustrated the tongue 7 is the part which is subjected to the highest temperature. Silica masonry at this point would fuse much more rapidly than the basic mass 2. For this reason the upper main part thereof is made of highly refractory material and a thin layer of silica masonry is present only on its lower side. Under the influence of the high temperatures here prevailing the silica bricks commence to fuse and disappear on the tongue to a slight depth of, for example, 5 to 10 cms. If the considerably more resistant tongue portion made of magnesite melts or crumbles, a portion of the silica bricks will always simultaneously fuse off, so that during the course of the furnace operation, the highly refractory main mass will always project slightly beyond the silica mass disposed beneath and protect the same. The projecting part of the high refractory main mass is of so slight a thickness, that mechanical strains can scarcely take place.

Owing to the fact that the piers or pillars of the furnace may be made of magnesite products or other masses having a high temperature resistance and that the mass of the silica brick arch layer is only of relatively small thickness, the fused products of which accordingly only slightly attack the bottom of the gas channel, the wear of the gas ports is much slower, less intense and more uniform than with other construction materials. Uniform furnace operation from the start to finish is accordingly ensured.

In first line the new construction is adapted for such parts of furnaces which support other parts of the furnace construction or must carry themselves, i. e. doors, openings, crowns or the arches thereof, and while the lining is subjected to the action of high temperatures and scorifying agents.

I claim:

1. Gas ports for Siemens-Martin furnaces and other highly treated metallurgical furnaces comprising a gas channel and an air channel disposed above the gas channel, and a wall separating said gas channel from said air channel, the main mass of said wall consisting substantially of highly refractory oxidic material, the surface of said wall facing said gas channel consisting of a relatively thin layer of silica masonry and the surface of said wall facing said air channel consisting of a layer of chromite.

2. Gas ports according to claim 1 wherein the main mass of said wall consists substantially of a mass selected from the group consisting of magnesite masonry and magnesite tamping masses and the surface of said wall facing said gas channel consists of a relatively thin layer of silica masonry and a layer of neutral refractory material is disposed between said main mass and said silica masonry.

3. Gas ports according to claim 1 wherein the main mass of said wall is constructed of magnesite bricks intimately joined together by interposing thin steel strips and burning, and the surface of said wall facing said gas channel consists of a relatively thin layer of silica masonry.

4. Gas ports according to claim 1 wherein the main mass of said wall is constructed of highly oxidic tamping masses having a high mechanical strength produced by adding small quantities of flux and burning, and the surface of said wall facing said gas channel consists of a relatively thin layer of silica masonry.

J. GODENNE.